United States Patent
McClure et al.

(10) Patent No.: US 9,335,187 B2
(45) Date of Patent: May 10, 2016

(54) METHODS FOR ASSEMBLING DEVICES USING PRESSURE INDICATOR ADHESIVES

(71) Applicant: Apple Inc., Cupertino, CA (US)

(72) Inventors: Stephen R. McClure, San Francisco, CA (US); Derek W. Wright, San Francisco, CA (US); Carl R. Peterson, Santa Clara, CA (US); Kristina A. Babiarz, San Jose, CA (US)

(73) Assignee: Apple Inc., Cupertino, CA (US)

( * ) Notice: Subject to any disclaimer, the term of this patent is extended or adjusted under 35 U.S.C. 154(b) by 520 days.

(21) Appl. No.: 13/679,699

(22) Filed: Nov. 16, 2012

(65) Prior Publication Data

US 2014/0138011 A1  May 22, 2014

(51) Int. Cl.
*G01D 11/00* (2006.01)
*C09J 5/00* (2006.01)
(Continued)

(52) U.S. Cl.
CPC . *G01D 11/00* (2013.01); *C09J 5/00* (2013.01); *C09J 7/0207* (2013.01); *C09J 11/02* (2013.01);
(Continued)

(58) Field of Classification Search
CPC ............... B32B 37/1284; G01D 11/00; Y10T 442/2754; C09J 5/00; C09J 7/0207; C09J 11/02; C09J 2205/11; C09J 2400/143; C09J 240/163; C08K 9/10
USPC ........ 156/64, 367; 116/200; 73/150 A, 150 R
See application file for complete search history.

(56) References Cited

U.S. PATENT DOCUMENTS 6,548,164 B1  4/2003  Bacon, Jr.
7,121,155 B2  10/2006  Johansson et al.
(Continued)

FOREIGN PATENT DOCUMENTS

JP          05235094 A  *  9/1993  .............. H01L 21/60
JP       2008003315 A  *  1/2008

OTHER PUBLICATIONS

Fei Lu et al, Impact damage to apple fruits in commercial corrugated fiberboard box packaging evaluated by the pressure-sensitive film technique, Apr. 2010, Journal of Food, Agriculture & environment, vol. 8 (2), pp. 218-222.*

(Continued)

*Primary Examiner* — George Koch
(74) *Attorney, Agent, or Firm* — Treyz Law Group, P.C.; G. Victor Treyz; Joseph F. Guihan

(57) ABSTRACT

Pressure indicator pressure sensitive adhesive may contain microspheres that burst and release indicator when subjected to pressure and thereby produce a detectable indication of how much pressure has been applied when forming an adhesive joint between opposing structures. Electronic device structures can be assembled using the pressure indicator pressure sensitive adhesive. A camera or other sensor may monitor joint formation. The camera can gather infrared image data, visible light image data, or ultraviolet light image data. Sensor data such as magnetic or ultrasonic sensor data can also be collected on an adhesive joint. Joint inspection can be performed on test structures and production structures and corresponding adjustments made to the joint formation process. Positioners and other equipment that compresses the pressure indicator pressure sensitive adhesive can be adjusted in real time or calibrated using information about the condition of the pressure indicator pressure sensitive adhesive.

19 Claims, 16 Drawing Sheets

(51) Int. Cl.
  *C09J 7/02* (2006.01)
  *C09J 11/02* (2006.01)
  *C08K 9/10* (2006.01)

(52) U.S. Cl.
  CPC .............. *C08K 9/10* (2013.01); *C09J 2205/11* (2013.01); *C09J 2400/143* (2013.01); *C09J 2400/163* (2013.01)

(56) References Cited

U.S. PATENT DOCUMENTS

| | | | | |
|---|---|---|---|---|
| 2005/0158540 | A1* | 7/2005 | Sakai | C09J 7/0207 428/349 |
| 2010/0167614 | A1* | 7/2010 | Lu et al. | 442/151 |
| 2010/0326198 | A1 | 12/2010 | Ribi | |
| 2011/0143056 | A1* | 6/2011 | Nakazono et al. | 428/1.1 |
| 2011/0281195 | A1 | 11/2011 | Fuller et al. | |
| 2012/0180928 | A1* | 7/2012 | Bruck | 156/64 |
| 2013/0023622 | A1 | 1/2013 | Lu et al. | |
| 2013/0061681 | A1* | 3/2013 | Trahan et al. | 73/700 |

OTHER PUBLICATIONS

"Tactile Pressure Indicating Sensor Film," Sensor Products, Inc. Apr. 11, 2011 (2 pages) [Retrieved on Apr. 19, 2013]. Retrieved from the Internet<URL:http://www.sensorprod.com/static/wafer-bonding.php>.

Fuji Films, "Fuji PreScale Pressure Film tm," 2011, 2 pages.

* cited by examiner

METHODS FOR ASSEMBLING DEVICES USING PRESSURE INDICATOR ADHESIVES

BACKGROUND

This relates generally to adhesives and, more particularly, to pressure sensitive adhesives.

Electronic devices often include components that are assembled using adhesives. Adhesives tend to be more compact than screws and other fasteners. Adhesives such as pressure sensitive adhesives, which are a class of adhesive that can be activated by application of pressure, are easier to rework than welds. The use of pressure sensitive adhesives may also help minimize assembly complexity and materials costs. Cellular telephones and other modern electronic devices often contain numerous joints formed from pressure sensitive adhesives.

Although pressure sensitive adhesives offer advantages over other techniques for forming joints in electronic devices, care must be taken to ensure uniform activation in a pressure sensitive adhesive layer. If pressure is unevenly applied during assembly, a pressure sensitive adhesive joint may have weak portions that are prone to failure.

To ensure that pressure sensitive adhesive joints are being formed properly, manufacturers can perform spot tests using special test units. In a typical scenario, parts in a test device are assembled using layers of pressure indicator film (sometimes referred to as pressure paper). The layers of pressure indicator film exhibit color changes that are proportional to applied pressure. If the layers of pressure indicator film indicate that pressure is being applied with inadequate uniformity, remedial changes can be made to the manufacturing process.

It is not always possible, however, to accurately predict how pressure sensitive adhesive joints will be formed from test results obtained using pressure indicator film. There is often a poor correlation between pressure indicator film tests and the actual pressure sensitive adhesive joints that are formed in production units, because pressure indicator film tests do not measure the actual pressures experienced by the adhesive.

It would therefore be desirable to provide improved ways for forming and evaluating pressure sensitive adhesive joints.

SUMMARY

Pressure indicator pressure sensitive adhesive may be provided for forming adhesive joints. The pressure indicator pressure sensitive adhesive may have microspheres that contains indicator. The microspheres are configured to burst upon application of pressure to the adhesive. Developer can be incorporated into the adhesive that reacts with the indicator when the indicator is released from the microspheres. The indicator produces a detectable indication of how much pressure has been applied when forming an adhesive joint between opposing structures. For example, the indicator may produce a visible stain at the adhesive joint when the adhesive joint is formed using more than a given amount of pressure.

Electronic device structures can be assembled using the pressure indicator pressure sensitive adhesive. A camera or other sensor may monitor joint formation. The camera can gather infrared image data, visible light image data, or ultraviolet light image data. Sensor data such as magnetic or ultrasonic sensor data can also be collected on a joint.

Control circuitry and manual visual inspection can be performed on test structures and production structures. Corresponding adjustments to the adhesive joint formation process can then be made. Positioners and other equipment that compresses the pressure indicator pressure sensitive adhesive can be adjusted in real time or can be calibrated using information about the condition of the pressure indicator pressure sensitive adhesive.

Pressure indicator pressure sensitive adhesive may contain one type of microsphere such as a microsphere that produces a stain of a particular color upon bursting or may contain multiple types of microspheres each of which is configured to release a stain of a different color when a different respective pressure has been exceeded.

Further features, their nature and various advantages will be more apparent from the accompanying drawings and the following detailed description of the preferred embodiments.

DETAILED DESCRIPTION

Adhesive may be used in attaching parts together such as structures formed from metal, plastic, ceramic, glass, carbon-fiber composites and other fiber-based composites, or other materials. An illustrative electronic device of the type that can be assembled using adhesive is shown in FIG. 1.

Figure 1:
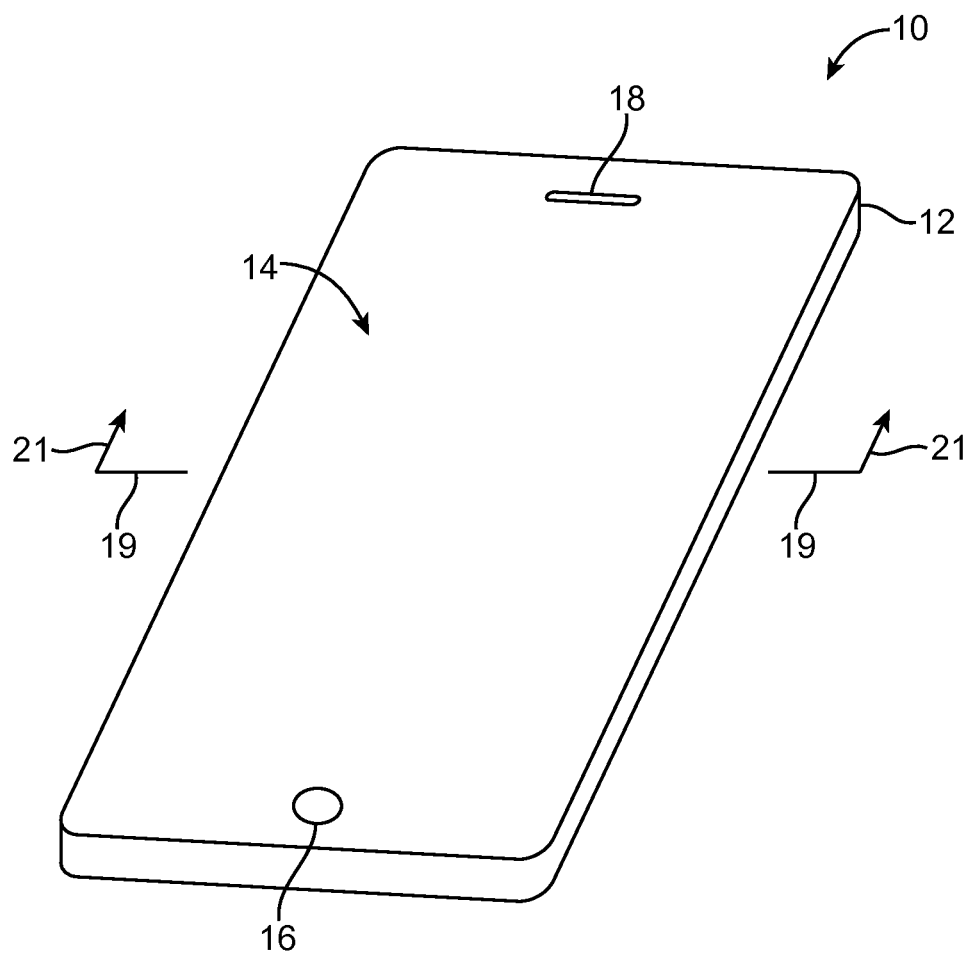
FIG. 1 is a perspective view of an illustrative electronic device such as a handheld electronic device with structures that have been assembled using pressure sensitive adhesive in accordance with an embodiment.

Electronic device 10 of FIG. 1 is a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 16 and speaker port 18.

The configuration of FIG. 1 in which device 10 is a small portable device is merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, is formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes display pixels formed from liquid crystal display (LCD) components or other suitable image pixel structures such as image pixel structures based on organic light-emitting diodes, electrophoretic display structures, electrowetting displays, or other display technologies.

A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 2:
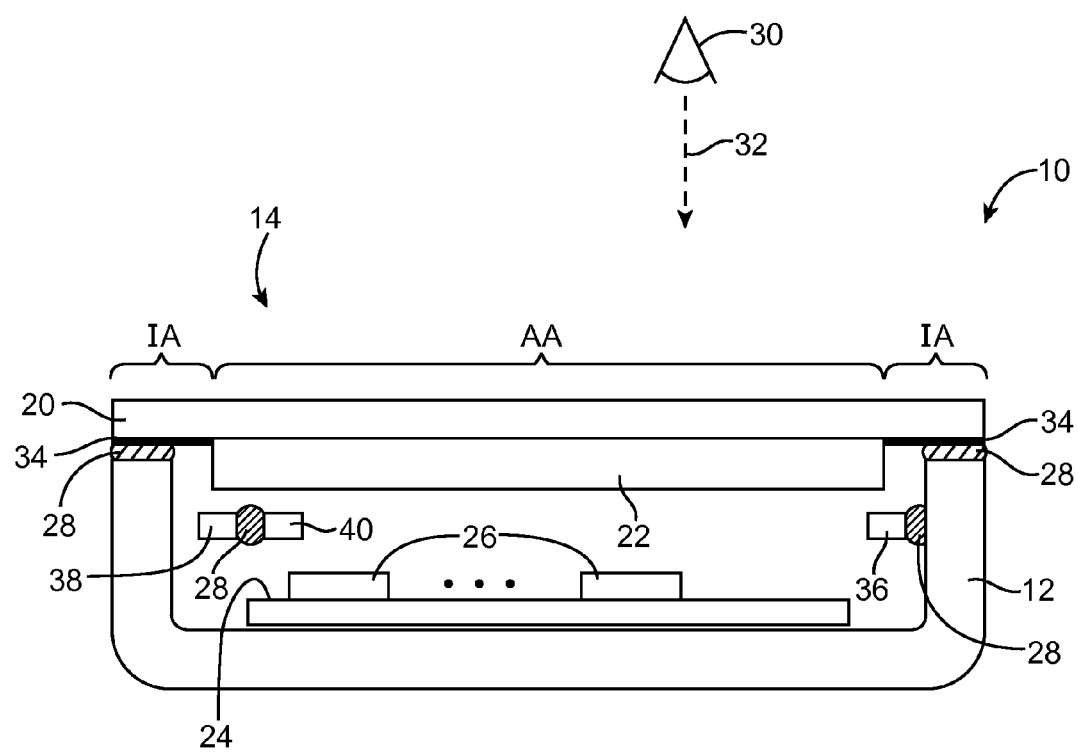
FIG. 2 is a cross-sectional side view of an electronic device of the type shown in FIG. 1 showing how pressure sensitive adhesive may be used to join structures such as a display cover layer and electronic device housing in accordance with an embodiment.

FIG. 2 is a cross-sectional side view of device 10 of FIG. 1 taken along line 19 and viewed in direction 21. As shown in FIG. 2, display 14 is mounted in housing 12. Display 14 has a display cover layer such as display cover layer 20 and a display module such as display module 22. Display cover layer 20 is a clear transparent member such as a layer of clear glass or a layer of transparent plastic. Display module 22 contains liquid crystal display structures, electrowetting display structures, electrophoretic display structures, organic light-emitting diode display structures, or other display structures. Display module 22 creates images for viewer 30 in central active area AA of display 14. Active area AA may have a rectangular shape when viewed by viewer 30 in direction 32.

Inactive area IA of display 14 of FIG. 2 surrounds active area AA. Display module 22 does not extend into inactive area IA, so images are not displayed in inactive area IA. In rectangular devices such as device 10 of FIG. 1, inactive area IA forms a rectangular ring. The underside of display cover layer 20 in inactive area IA is covered with a layer of opaque masking material such as ink 34. Ink 34 may be black or white, or may have other suitable colors. The presence of ink 34 may block internal device components from view by viewer 30.

Housing 12 may form an interior cavity in which electronic components and other structures are mounted. Structures 26 in the internal cavity may include electrical components such as sensors, cameras, buttons, integrated circuits, audio components, light-emitting components, and other device components. Electrical components and other components may be interconnected using one or more electrical paths such as paths formed in substrates such as substrate 24. Substrates such as substrate 24 may be formed from plastic, printed circuit material (e.g., rigid printed circuit board material such as fiberglass-filled epoxy or flexible printed circuit substrate materials such as sheets of polyimide or other flexible layers of polymer), ceramic, or other dielectric.

In addition to structures such as structures 26 that are mounted to substrate 24, device 10 may contain internal structures that are mounted to housing 12 such as structure 36 and may contain structures that are mounted to each other (with or without being attached to housing 12) such as structures 38 and 40.

Structures 26, 36, 38, and 40 may, in general, include electrical components, housing structures (e.g. internal housing structures such as brackets, rails, plates, or other support structures), display components, printed circuits, substrates for antennas and other devices, members formed from glass, metal, ceramic, polymers, or other structures in device 10.

As shown in FIG. 2, structures such as structures 20, 12, 36, 38, 40, 26, and 24 may be attached to one another using adhesive such as pressure sensitive adhesive 28. Adhesive 28 preferably has pressure indicator functions to ensure that assembly operations are performed satisfactorily. Pressure sensitive adhesive with pressure indicator capabilities is sometimes referred to herein as pressure indicator pressure sensitive adhesive or pressure indicator adhesive. Pressure indication functionality may be implemented using structures that indicate how much pressure is applied to the adhesive using light-based indicator structures such as visual indicator structures, magnetic indicator structures, or indicator structures that reflect how much pressure is applied to the adhesive using other techniques. Pressure indicator adhesive may be monitored during joint formation and/or after joint formation to assess joint quality.

Figure 3:
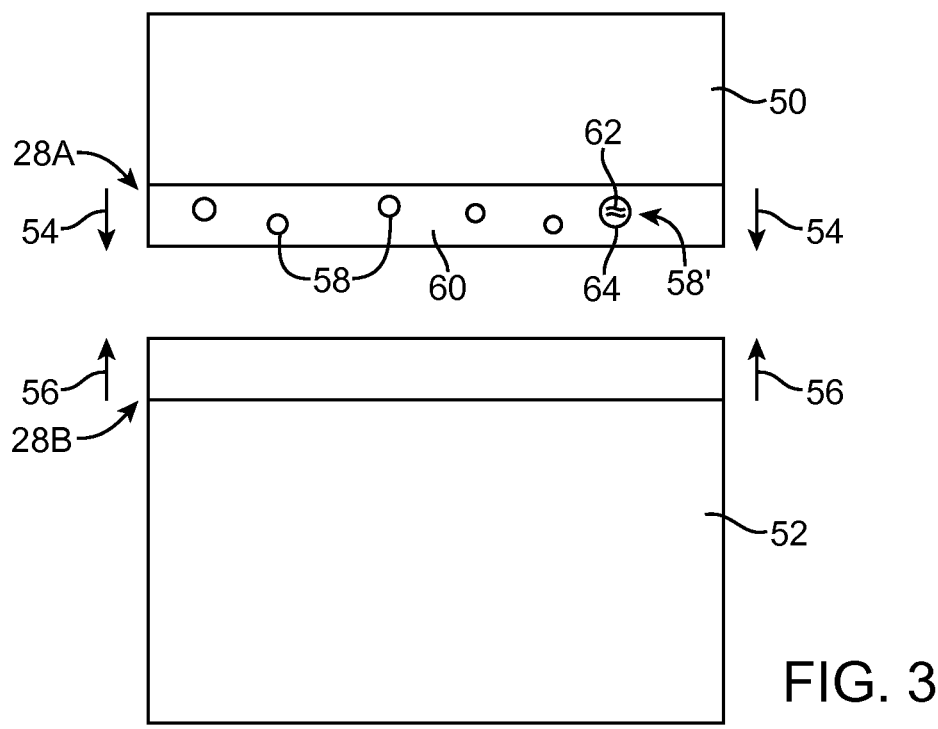
FIG. 3 is a cross-sectional side view of a pair of device structures being joined using a pressure sensitive adhesive layer containing indicator and an associated developer layer in accordance with an embodiment.

FIG. 3 is a cross-sectional side view of structures in device 10 during adhesive joint formation. Structures 50 and 52 may be any suitable structures associated with device 10 such as structures 20, 12, 36, 38, 40, 26, and 24 of FIG. 2 (as examples). In the example of FIG. 3, a pressure indicator adhesive joint is being formed using layers 28A and 28B. The configuration of FIG. 3 uses a two-part system in which layer 28A serves as an indicator film and layer 28B serves as a developer film. When the two films are combined under pressure to form pressure indicator pressure sensitive adhesive joint 28, a visible indicator or other measurable characteristic is produced that is responsive to the amount of pressure used to form the adhesive joint.

With one illustrative configuration for the two-part system of FIG. 3, layer 28B is a developer that reacts with an indicator material in microspheres 58 or other structures in layer 28A to form a visible stain or other detectable characteristic indicating that a given pressure has been applied to the adhesive. As shown by illustrative microsphere 58', each microsphere 58 of FIG. 3 contains indicator material 62 (e.g., a dye that reacts with developer or other material that can produce a visible stain or measureable characteristic when microspheres 58 burst). Material 62 is contained within a coating such as spherical shell 64 of microsphere 58'.

Shells such as shell 64 may be formed from a material such as polymer that bursts when subjected to more than a threshold amount of pressure. When microspheres 58 burst in this way, indicator material 62 is exposed to developer layer 28B and forms a visible indicator such as a colored area that indicates that adhesive joint 28 has been exposed to more than the threshold amount of pressure. Due to manufacturing variations, there is generally a range of pressures over which microspheres 58 of a given type will burst. To allow precise measurement of applied pressure, microspheres 58 may, if desired, be configured to burst over a relatively narrow range of pressures.

When forming certain joints such as joints between metal structures, it may be desirable to pretreat exposed metal surfaces. Pretreating may be performed by coating exposed metal with a polymer-based metal primer that prepares the exposed metal for satisfactory bonding to pressure sensitive adhesive. To minimize the number of coating layers to be applied to the metal structure, layer 28B may be formed using a combination of developer and primer (i.e., the developer can be mixed into the primer, so that both the developer and primer materials are applied as part of the same coating). If desired, primer and developer layers can also be applied separately when metal surfaces are being bonded.

To bond structures 50 and 52 together, structures 50 may be moved in direction 54 and/or structures 52 may be moved in direction 56. A computer-controlled press or manually controlled press or other equipment may be used in pressing structures 50 and 52 together. The process of moving structures 50 and 52 together applies pressure to layers 28A and 28B. Layers 28A and 28B therefore combine to form pressure indicator pressure sensitive adhesive layer 28 of FIG. 4.

Figure 4:
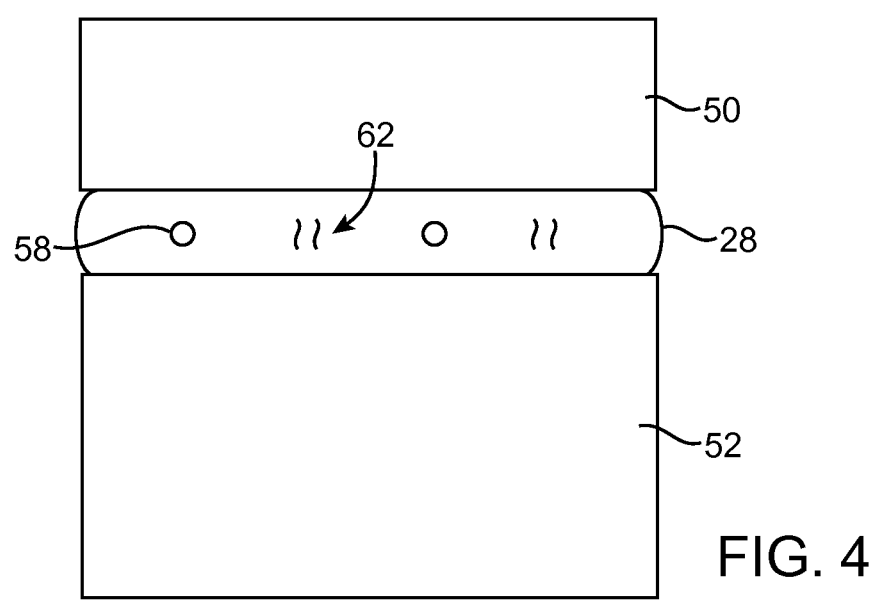
FIG. 4 is a cross-sectional side view of the structures of FIG. 3 following joining with pressure indicator adhesive formed from the pressure sensitive adhesive material, indicator, and developer in accordance with an embodiment.

When sufficient pressure is applied to pressure indicator pressure sensitive adhesive 28, a satisfactory pressure sensitive adhesive joint will be formed between structures 50 and 52 and the indicator in adhesive 28 will be activated (e.g., microspheres 58 will break to release indicator 62, as shown in FIG. 4).

In some situations, pressure sensitive adhesive joints may be poorly formed. For example, if parts of pressing equipment are misaligned, joints may experience more pressure in some areas than in others. As a result, adequate pressure may only be applied to adhesive 28 in part of the joint. By using pressure indicating adhesive, the locations in a joint that are experiencing inadequate pressure can be identified and appropriate action taken. For example, a press may be calibrated or other adjustments made to the manufacturing process.

Figure 5:
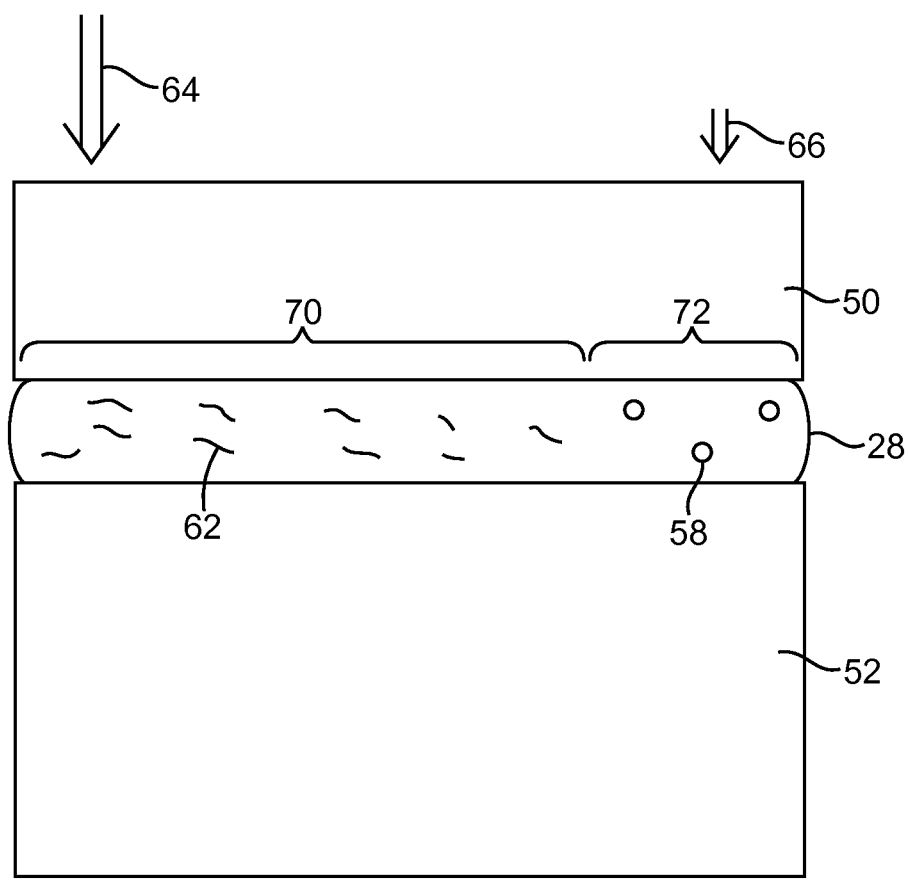
FIG. 5 is a cross-sectional side view of device structures joined using pressure indicator adhesive in a configuration in which pressure was unevenly applied to the pressure indicator adhesive during joint formation in accordance with an embodiment.

FIG. 5 is a side view of structures 50 and 52 during the process of forming a joint with pressure indicating adhesive 28. In the FIG. 5 example, a relatively large amount of force 64 (e.g., an amount of force that exceeds the activation threshold of adhesive 28 and the pressure indicator in adhesive 28) is being exerted on portion 70 of adhesive 28, so indicator 62 in portion 70 is activated. A relatively small amount of force 66 is being exerted on portion 72 of adhesive 28, so portion 72 is not activated. Upon inspection, the inadequacy of the bond formed in portion 72 can be detected and corrective actions taken (e.g., by applying more pressure in region 72).

Potential problems with forming joints from pressure sensitive adhesive can be revealed by forming joints with pressure indicating adhesive in special test structures or in actual production devices such as device 10 of FIG. 1. As an example, a test version of device 10 can be formed that does not include black ink 34, thereby facilitating visual inspection of pressure indicating adhesive 28 through display cover layer 20 in inactive area IA. Test units may also be formed that omit expensive (but irrelevant) components while retaining structures associated with joint formation so that these structures may be tested by forming test joints of pressure indicator pressure sensitive adhesive. In production units that include opaque layer 34, pressure indicating adhesive 28 can be inspected by removing display cover layer 20 (e.g., by applying heat to soften adhesive 28 sufficiently to allow display cover layer 20 to be removed from housing 12).

Adhesive 28 (e.g., pressure sensitive adhesive material 60) may be formed from an opaque or transparent material. Opaque adhesive may be helpful in blocking light leakage in devices with displays and other light sources and may enhance device aesthetics. Transparent adhesives may facilitate inspection of activated indicator in adhesive 28. For example, in a situation in which one or both of structures 50 and 52 is transparent, the use of transparent material in adhesive 28 may facilitate visual inspection of the adhesive joint formed from adhesive 28 through the transparent structures and the transparent adhesive material.

Figure 6:
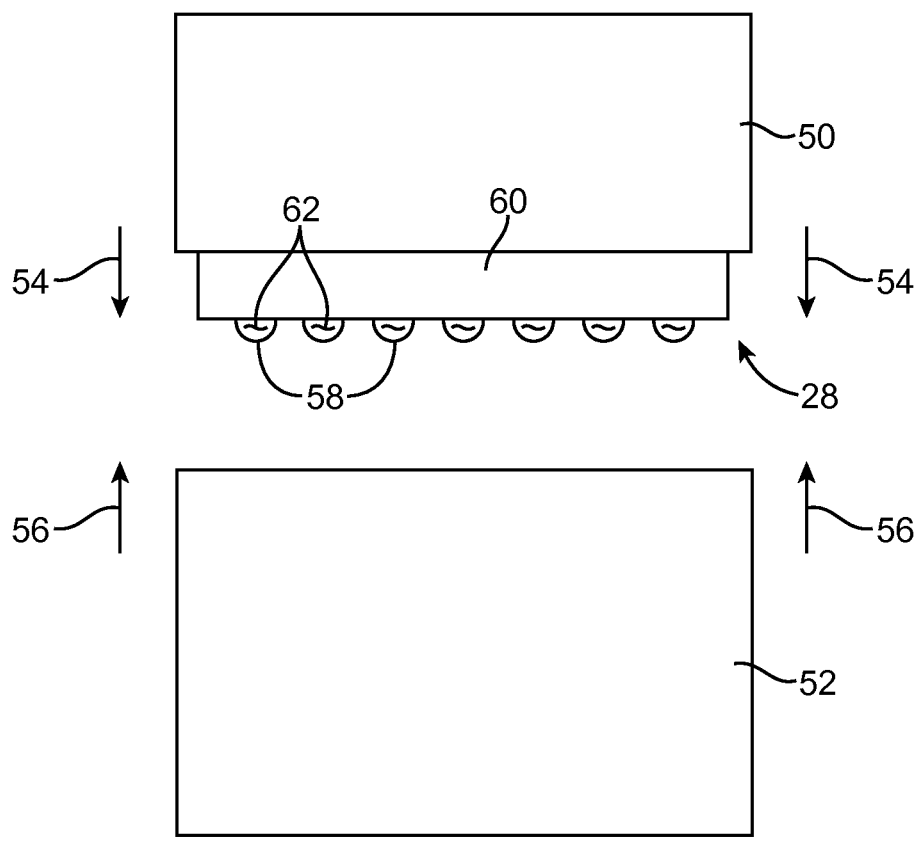
FIG. 6 is a cross-sectional side view of a pressure indicator adhesive configuration based on a layer of pressure sensitive adhesive with pressure indicator microspheres in accordance with an embodiment.

If desired, pressure indicating adhesive 28 can be formed using microspheres 58 embedded in a single layer of pressure sensitive adhesive material, as shown in FIG. 6. When structures 50 and 52 are moved towards each other to apply pressure to adhesive 28 of FIG. 6, microspheres 58 (sometimes referred to as indicator capsules) will burst and release indicator 62 (i.e., indicator 62 will stain the surfaces of structures such as structure 52 and/or structure 50). Developer may be incorporated into adhesive 28 to facilitate activation of the indicator material.

Figure 7:
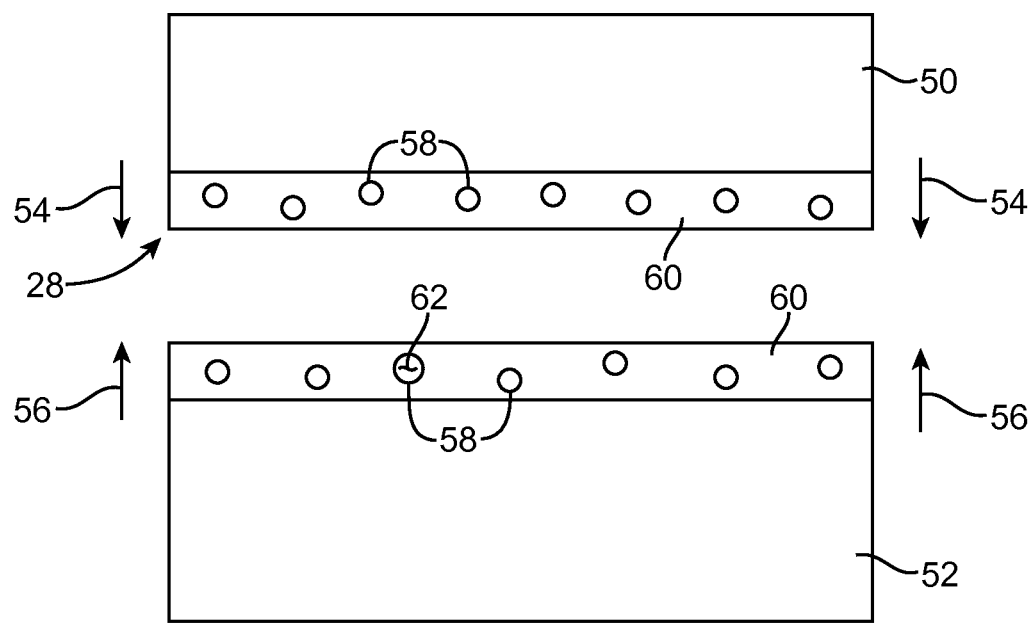
FIG. 7 is a cross-sectional side view of a pressure indicator adhesive arrangement based on two layers of pressure sensitive adhesive with embedded pressure indicator microspheres in accordance with an embodiment.

In the illustrative configuration of FIG. 7, pressure indicating adhesive 28 has been implemented using upper and lower layers of adhesive material 60 with embedded microspheres 58 containing indicator 62. When structures 50 and 52 are brought together by moving structures 50 in direction 54 and/or by moving structures 52 in direction 56, adhesive 28 will form an adhesive joint between structures 50 and 52. Microspheres 58 that are subjected to more than a predetermined threshold amount of pressure will release indicator 62 to facilitate evaluation of the pressure experienced by adhesive 28. Developer may be incorporated into adhesive 28 to facilitate activation of the released indicator.

Figure 8:
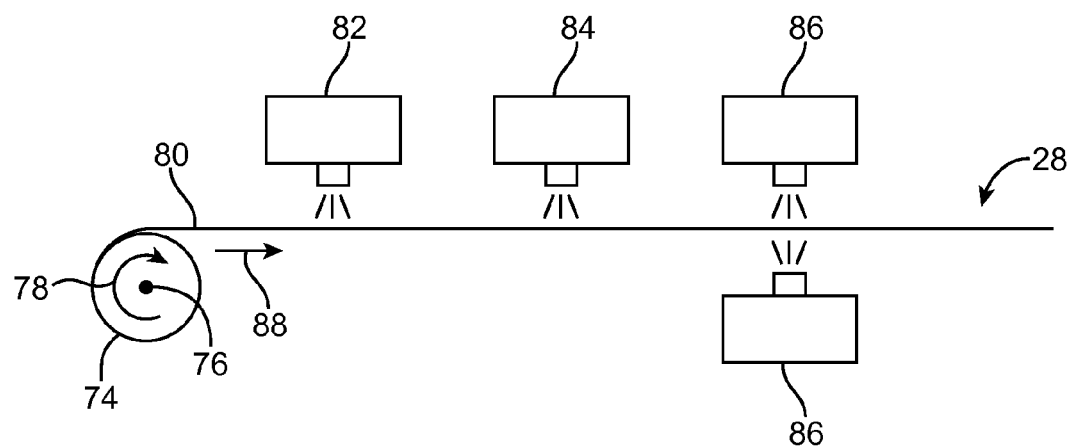
FIG. 8 is a side view of a system being used to produce pressure indicator pressure sensitive adhesive in the form of flexible adhesive tape for use in joining electronic device structures in accordance with an embodiment.

FIG. 8 is a system diagram showing equipment of the type that may be used in forming pressure indicator adhesive 28. Adhesive 28 may be formed on one or more carrier layers (sometimes referred to as backing layers). The carrier layers may be formed from sheets of polymer such as polyethylene terephthalate. In the illustrative configuration of FIG. 8, carrier 80 (e.g., a sheet of polymer) is wrapped around drum 74. During the process of forming a tape of pressure indicator adhesive 28, drum 74 rotates in direction 78 about rotational axis 76. This dispenses carrier 80 in direction 88. Carrier 80 moves past material dispensing tools 82, 84, and 86. Tools 82, 84, and 86 may be, for example, spraying equipment.

In the example of FIG. 8, material dispensing tool 82 dispenses developer, material dispensing tool 84 dispenses indicator structures such as microspheres 58 filled with indicator, and material dispensing equipment 86 dispenses pressure sensitive adhesive 60 on the opposing upper and lower surfaces of carrier 80.

Figure 9:
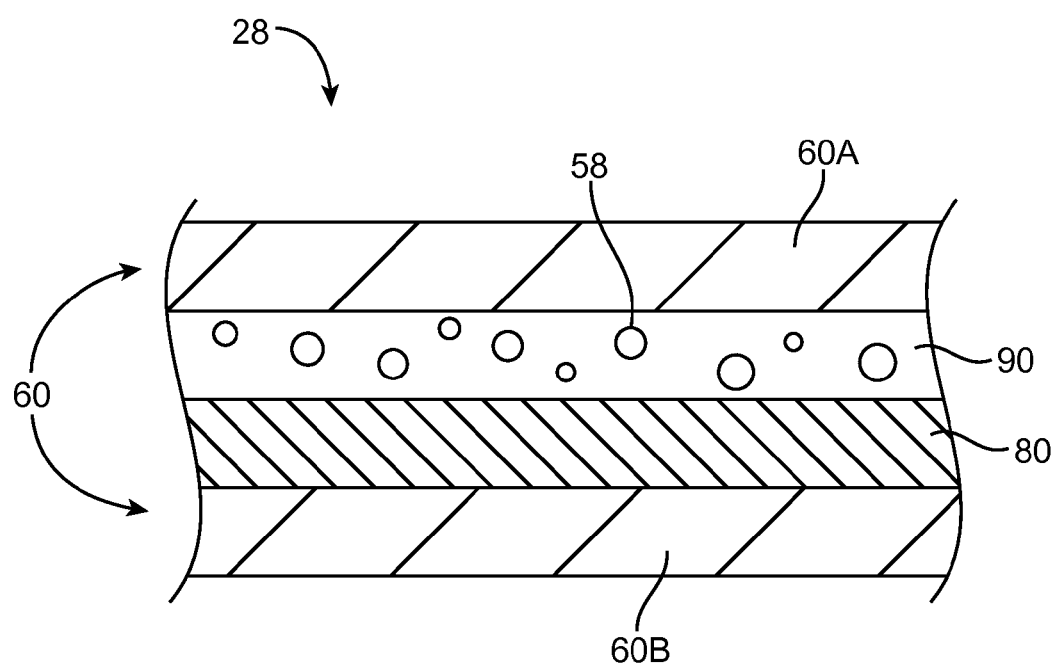
FIG. 9 is a cross-sectional side view of a pressure indicator pressure sensitive adhesive tape formed from a single polymer backing layer in accordance with an embodiment.

FIG. 9 is a cross-sectional side view of a layer of pressure indicator adhesive tape 28 formed using the equipment of FIG. 8. Carrier layer 80 is formed from a layer of polymer. Developer 90 and indicator structures such as microspheres 58 form a mixture on the upper surface of carrier 80. Pressure sensitive adhesive 60 may include upper layer 60A and lower layer 60B. Developer 90 and microspheres 58 are shown as forming a distinct layer of material in pressure indicator adhesive tape 28 of FIG. 9, but may form clumps of material and/or material that becomes partly or completely dispersed within pressure sensitive adhesive layer 60A.

Figure 10:
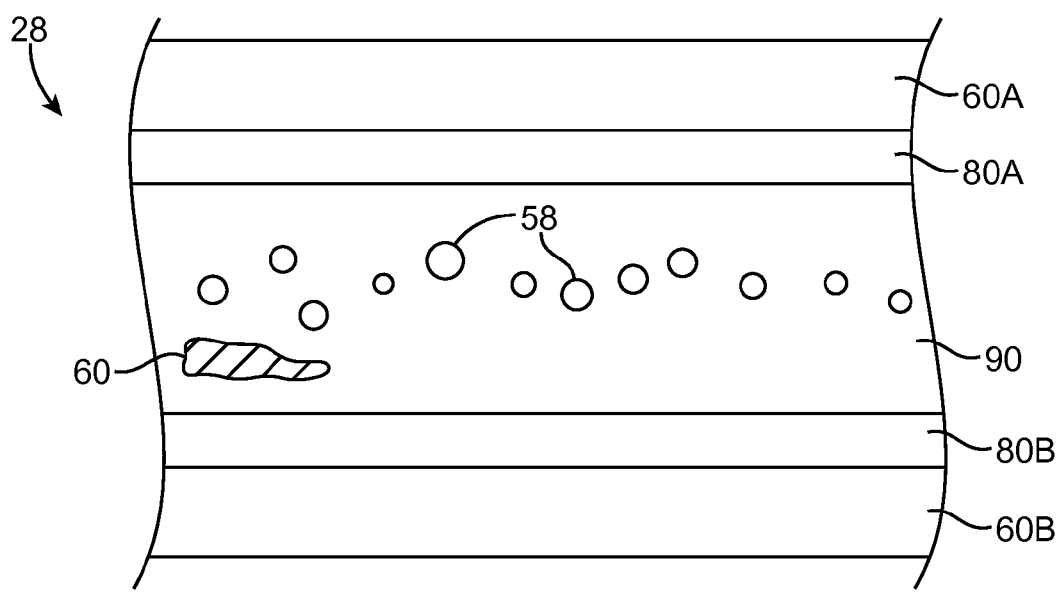
FIG. 10 is a cross-sectional side view of a pressure indicator pressure sensitive adhesive tape formed from a pair of polymer backing layers in accordance with an embodiment.

If desired, pressure indicator adhesive 28 may be formed using multiple carriers. This type of configuration is shown in the illustrative example of FIG. 10. In the FIG. 10 configuration, pressure indicator adhesive tape 28 has upper carrier 80A and lower carrier 80B. Carriers 80A and 80B may be formed from flexible polymer films. A layer of developer 90 and indicator microspheres 58 may be interposed between carrier layers 80A and 80B. Pressure sensitive adhesive material 60 may also be interposed between carrier layers 80A and 80B if desired. Upper pressure sensitive adhesive layer 60A and lower pressure sensitive adhesive layer 60B may be formed on the upper and lower surface of carriers 80A and 80B, respectively.

Figure 11:
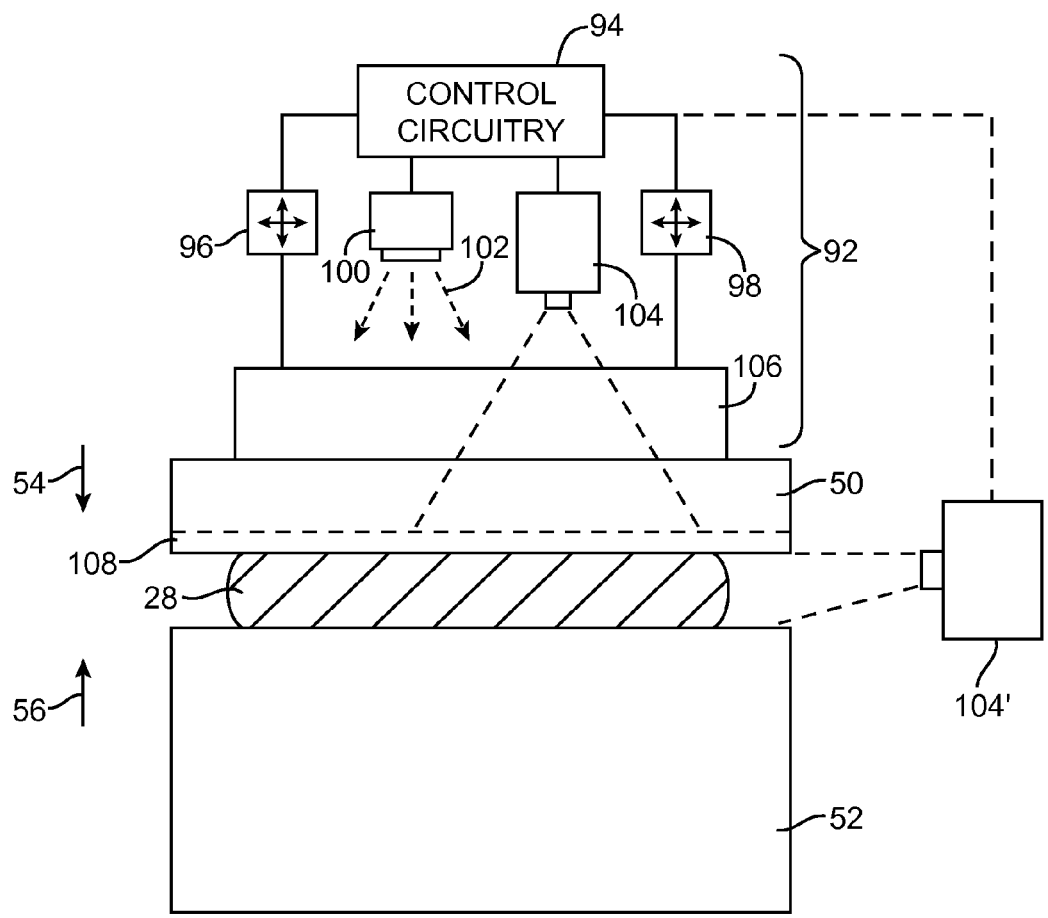
FIG. 11 is side view of a system for gathering and using information from a pressure indicator adhesive in real time during formation of an adhesive joint in accordance with an embodiment.

FIG. 11 is a system diagram of equipment 92 that is being used to form an adhesive bond between structures 50 and 52 using pressure indicator adhesive 28. Equipment 92 (sometimes referred to as a press) includes a press member such as member 106 that is used to exert force in direction 54 on structure 50. If desired, press structures such as press member 106 may be included in equipment 92 to move structure 52 in direction 56. When structures 50 and/or 52 are moved by equipment 92, adhesive 28 is compressed between structures 50 and 52 to form an adhesive bond.

Computer-controlled positioners such as positioners 96 and 98 may be used in controlling the movement of press structures 106. A light source such as light source 100 can be used to provide illumination 102. Illumination 102 may include infrared light, visible light, and/or ultraviolet light. One or more cameras such as camera 104 capture digital images of the structures being bonded using adhesive 28. Camera 104 may be located in a position that allows camera 104 to image adhesive 28 through one or more of structures 50 and 52. For example, as shown in FIG. 11, camera 104 may be configured to view adhesive 28 through a transparent structure that forms press member 106 (or through an opening in press member 106), through structure 50, through optional layer 108 on structure 50, and through the material in adhesive 28 itself. Camera 104 may also be located in a position such as the position occupied by camera 104' in FIG. 11 to allow direct viewing of an exposed edge portion of adhesive 28.

The way in which camera 104 is used to monitor the state of adhesive 28 depends on the type of light that is being produced by light source 100 and the light transmission characteristics of the structures that lie between source 100 and adhesive 28 and between adhesive 28 and camera 104. Consider, as an example, a scenario in which light source 100 produces visible light 102. Press member 106 in this scenario can have an opening that allows visible light 102 to reach structure 50 or may be formed from a visibly transparent material. Structure 50 can be visibly transparent. Layer 108 (e.g., a layer of opaque masking material such as material 34 of FIG. 2) may be omitted to allow visible light 102 to reach adhesive 28 (e.g., structures 50 and 52 from which layer 108 is omitted may be test structures that are used only for test purposes and not for manufacturing finished products). Adhesive 28 may be opaque or may be formed from a material that is transparent in the visible spectrum to facilitate visible inspection. In this type of configuration, visible light that illuminates adhesive 28 is picked up by camera 104, which is operating in the visible spectrum. The visible light images that are captured in this type of scenario can be used to evaluate the bond formed by adhesive 28 between structures 50 and 52.

If desired, light source 100 may produce infrared light. Layer 108 may be transparent to infrared light. For example, layer 108 may be a layer of infrared ink that is opaque at visible light wavelengths to serve as opaque masking layer 34 of FIG. 2 but that is transparent in the infrared portion of the light spectrum to allow visual inspection by camera 104 (e.g., a camera that is sensitive to infrared light). To prevent the undesired blocking of infrared light 102 in this type of inspection scenario, structure 106 may be formed from a material that is transparent to infrared light or may have an opening that allows light 102 to pass. Structures 50 (and, if desired, adhesive 28) may also be transparent to infrared light.

Ultraviolet light may also be used in inspecting adhesive 28. To perform ultraviolet light inspection, light source 100 produces ultraviolet light 102, camera 104 is an ultraviolet light sensitive camera, adhesive 28 preferably fluoresces under ultraviolet light illumination, and the intervening structures such as structures 50 (and, if present, optional layer 108) are formed from materials that are transparent to ultraviolet light.

Camera 104 can be configured to examine a portion of the bond formed from adhesive 28 or the can be configured to capture images of the entire bond being formed from adhesive 28. Control circuitry 94 such as a computer or other computing equipment, microprocessors, microcontrollers, memory, and other storage and processing circuitry receives image data from camera 104 and processes this data to determine how to control equipment such as positioners 96 and light source 100. If, for example, the right-hand portion of the bond being formed by adhesive 28 is being provided with inadequate pressure, equipment 92 may be calibrated by adjusting positioner 98 to supply additional pressure to the right-hand side of the bond. Adjustments may be made in real time while capturing images of the bond that is being formed (i.e., feedback may be provided dynamically during joint formation) or calibrating adjustments may be made after a given bond has been attempted so that subsequent bonds may be formed more satisfactorily. In a typical calibration scenario, one or more calibration units (e.g., test units) may be used calibrating equipment 92 (e.g., once per day). Following calibration, equipment 92 may be used to produce numerous production devices.

Microspheres 58 may be configured to burst in a narrow pressure range, there allowing indicator 62 to be activated only when a desired pressure threshold has been exceeded (i.e., pressure indicator adhesive 28 may be configured to exhibit a nearly binary behavior in which no indicator is visible below the activation threshold and in which the indicator is substantially all activated when adhesive 28 is exposed to pressures above the activation threshold). The amount of pressure to which adhesive 28 is exposed may also be revealed by incorporating microspheres 58 with different pressure release thresholds and different corresponding indicators 62 into adhesive 28.

Figure 12:
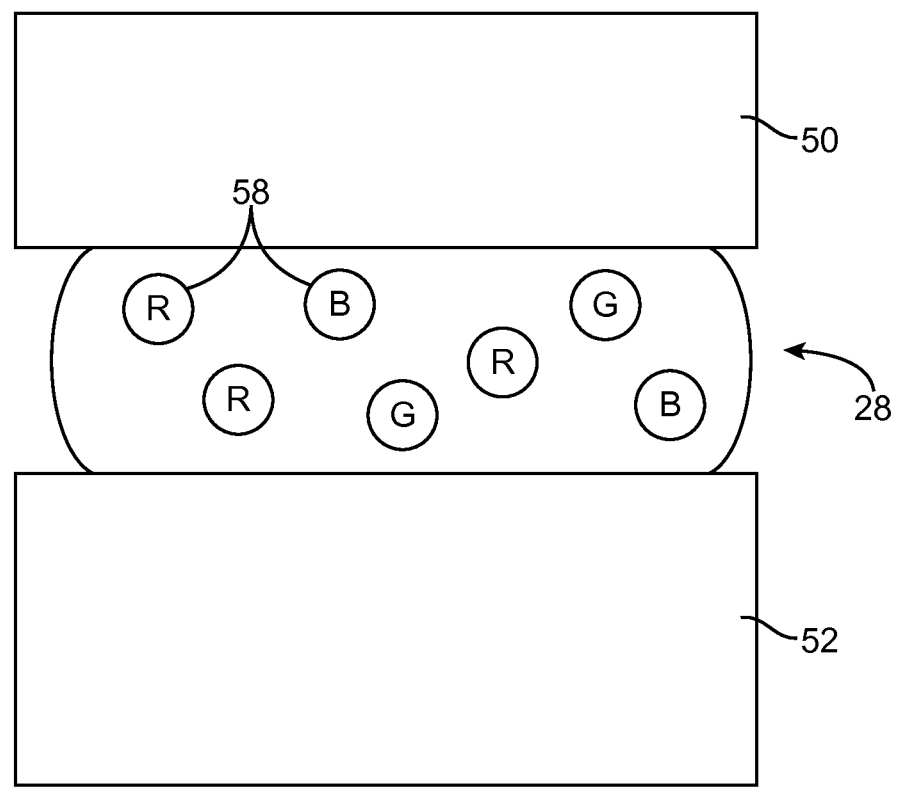
FIG. 12 is a cross-sectional side view of structures being joined by a layer of adhesive having different types of pressure indicator microspheres that are configured to burst at different pressures in accordance with an embodiment.

Consider, as an example, the scenario of FIG. 12 in which adhesive 28 has been provided with three different types of microspheres 58: red indicator microspheres R, blue indicator microspheres B, and green indicator microspheres G. Adhesive 28 includes pressure sensitive adhesive 60 and optional developer 90. When pressure is applied to bring structures 50 and 52 together, the microspheres in adhesive 28 burst and release indicator, which may react with developer 90 (if used).

Figure 13:
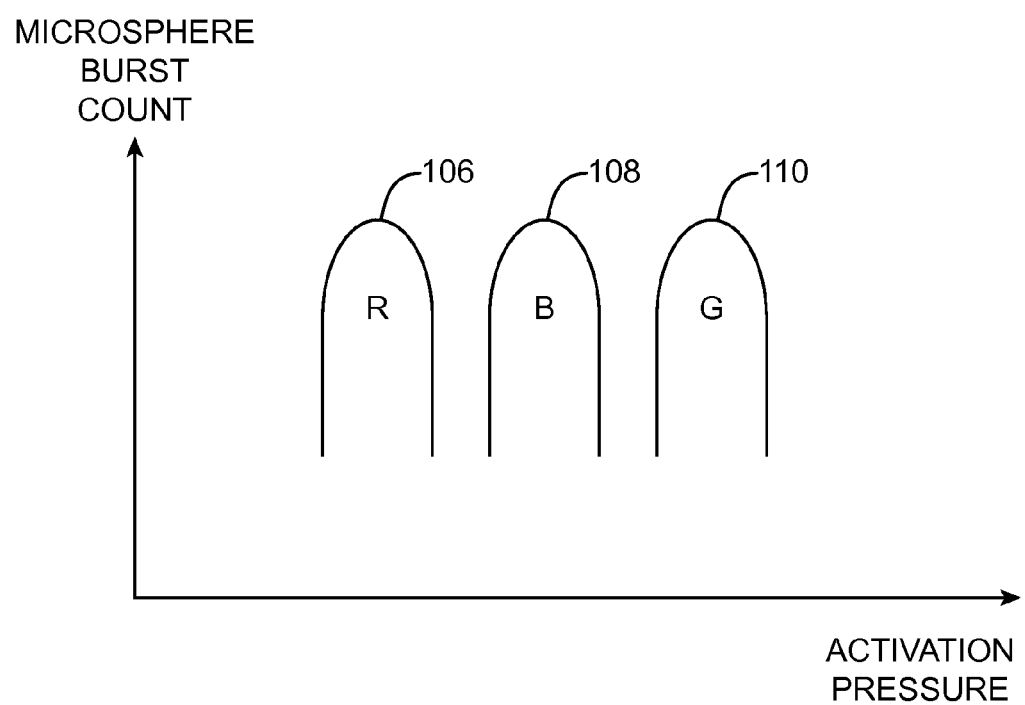
FIG. 13 is a graph showing how the three different sets of pressure indicator microspheres of FIG. 12 are configured to release indicator material at three different respective pressures in accordance with an embodiment.

As shown in FIG. 13, the color of the indicator that is released depends on the amount of pressure that is applied to adhesive 28. Red microspheres R are configured to burst at a relatively low value of applied pressure to adhesive 28 as indicated by curve 106 of FIG. 13, whereas green microspheres G are configured to burst at a relatively high value of applied pressure to adhesive 28 as indicated by curve 110 of FIG. 13. Blue microspheres B burst at a pressure above the activation pressure for red microspheres R and below the activation pressure for green microspheres G, as indicated by curve 108 of FIG. 13. Using manual visual inspection and/or using camera 104 in equipment 92, the pressure to which adhesive 28 is exposed can be determined by evaluating the colors present in adhesive 28.

Figure 14:
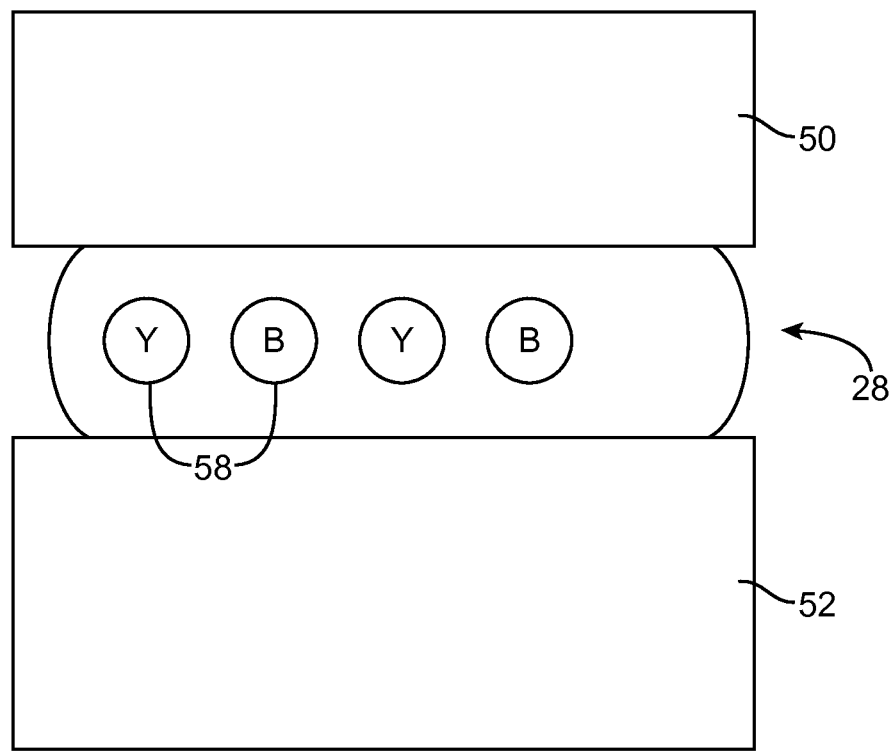
FIG. 14 is a cross-sectional side view of a layer of adhesive having pressure indicator microspheres that are configured to release indicators such as dyes of different colors at different respective pressure thresholds in accordance with an embodiment.
Figure 15:
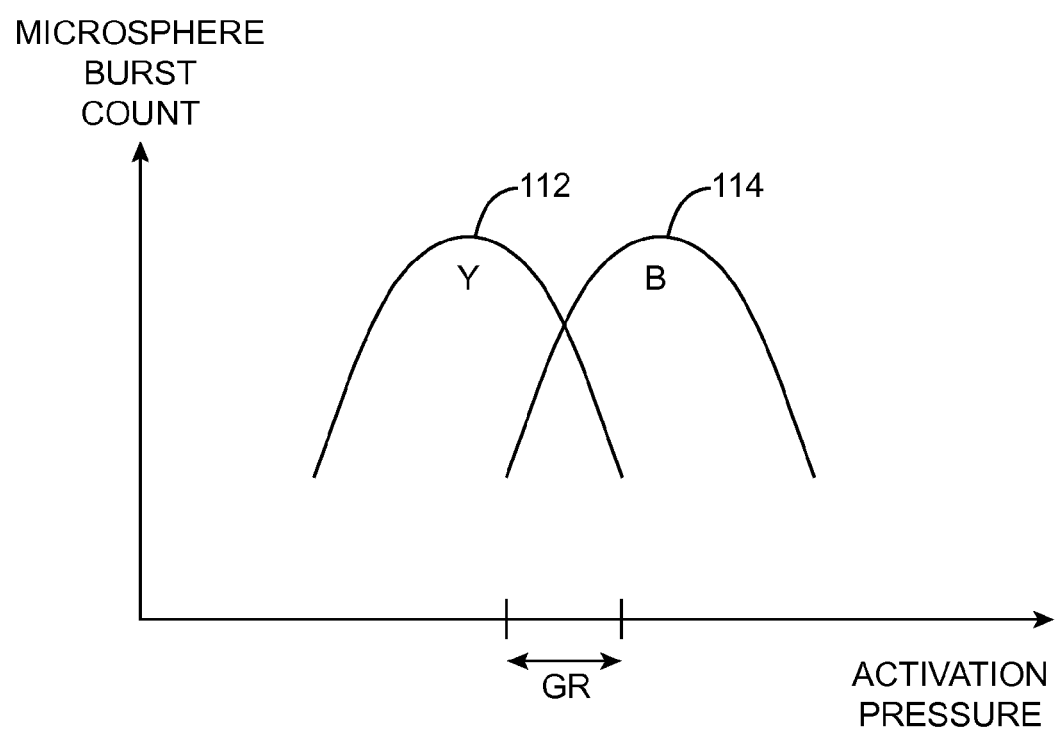
FIG. 15 is a graph showing how a pair of indicator microspheres of the type shown in FIG. 14 can be configured to release indicators that mix to produce a color that differs from the colors of the released indicators in accordance with an embodiment.

In the illustrative configuration of FIG. 14, pressure indicator adhesive 28 has been provided with yellow and blue microspheres. As shown by curve 112 in the graph of in the graph of FIG. 15, yellow microspheres Y may be configured to burst at an activation pressure that is lower than blue microspheres B are configured to burst. Yellow microspheres Y and blue microspheres B in this example have been configured to exhibit an overlapping range GR of burst pressures. In range GR, most of yellow microspheres Y and some of blue microspheres B will burst, giving rise to green color in adhesive 28. By visual inspection of adhesive 28 and/or using camera 104 of equipment 92, the pressure level to which adhesive 28 has been exposed during bond formation can be ascertained from the color of the activated adhesive (i.e., yellow, green, or blue).

Figure 16:
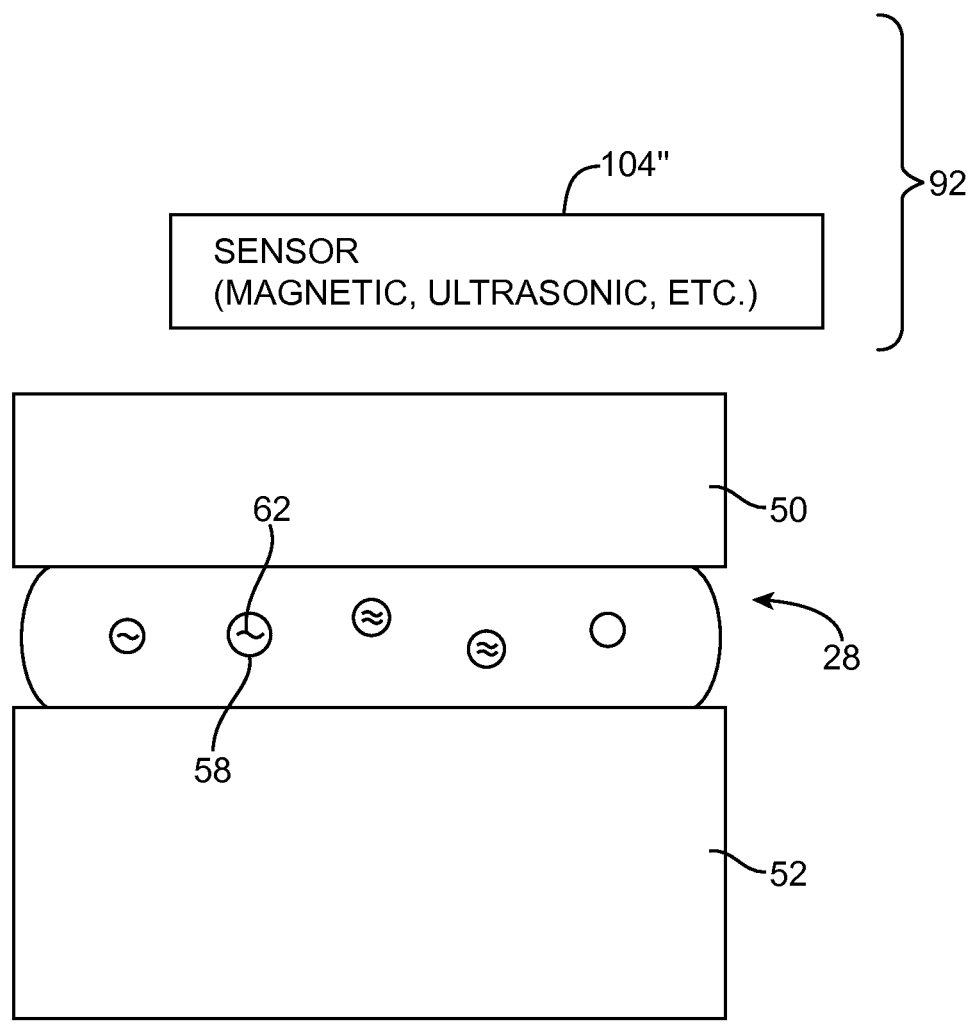
FIG. 16 is a cross-sectional side view of sensor equipment being used to monitor joint formation using pressure indicator pressure sensitive adhesive in accordance with an embodiment.

If desired, microspheres 58 may be provided with indicator 62 that exhibits magnetic properties or other properties that are detectable using sensors in addition to camera sensor 104 of equipment 92. The magnetic properties or other properties may change when microspheres 58 burst (e.g., ferromagnetic indicator material may be exposed to a developer that renders the indicator non-magnetic upon release of the ferromagnetic indicator material from microspheres 58, etc.) As shown in FIG. 16, equipment 92 may include sensor 104" for monitoring the status of indicator 62 in adhesive 28. Sensor 104" may be a magnetic sensor for measuring the magnetism of adhesive 28, an ultrasonic sensor for capturing ultrasonic images of adhesive 28, or other sensor. Positioners and control circuitry may be coupled to sensor 104" as described in connection with equipment 92 of FIG. 11, so that equipment 92 can make adjustments to the manufacturing process being used to form adhesive bond 28.

Figure 17:
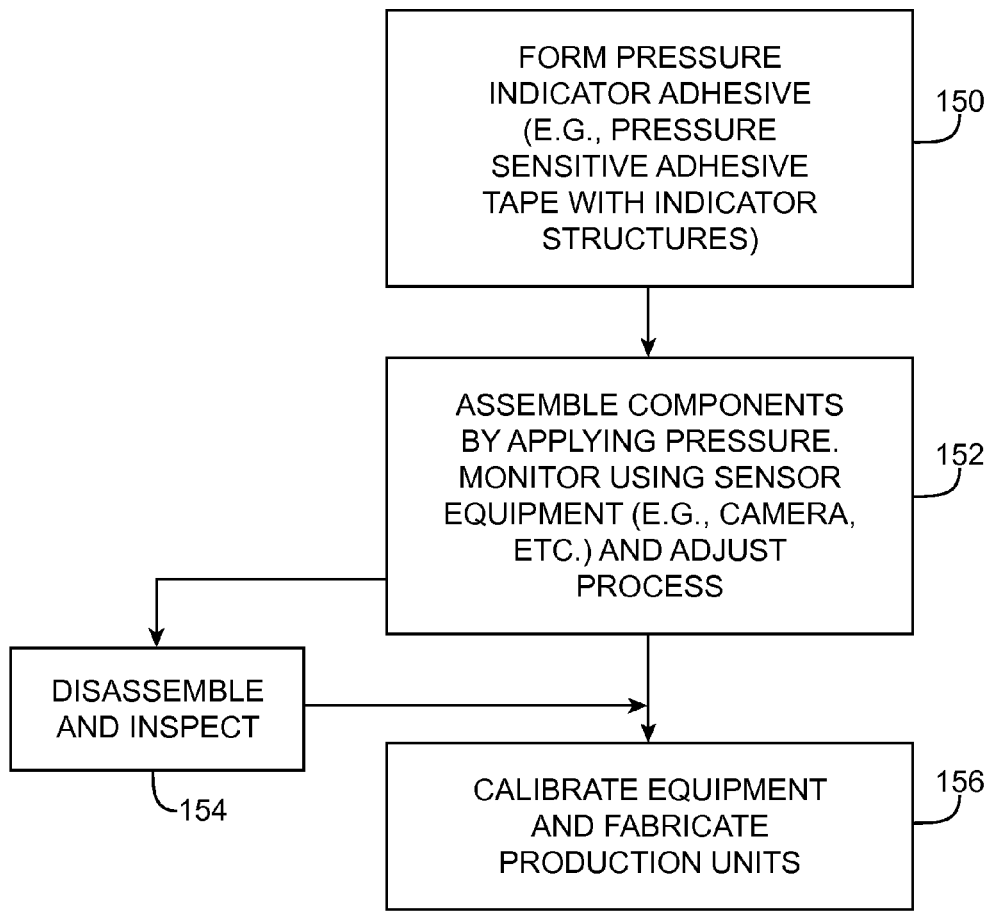
FIG. 17 is a flow chart of illustrative steps involved in using pressure indicator adhesive in forming adhesive bonds between device structures in accordance with an embodiment.

Illustrative steps involved in using pressure indicator pressure sensitive adhesive in manufacturing device 10 and structures for use in device 10 are shown in FIG. 17.

At step 150, pressure indicator adhesive 28 may be formed using equipment of the type shown in FIG. 8 or other suitable equipment. One or more polymer carrier layers may be used in forming the pressure indicator adhesive. Pressure sensitive adhesive material may be added to the carrier layers using spraying techniques or other adhesive material application techniques. To provide adhesive 28 with pressure indicator capabilities, indicator structures such as microspheres that contain indicator may be incorporated into adhesive 28. The microspheres may contain indicator that contain dyes or other substances that release color when the microspheres burst and/or may contain indicators that produce colors upon being released from burst microspheres and reacting with developer. Developer 90 may be incorporated into adhesive 28 and/or may be incorporated into other materials such as primer.

At step 152, components to be joined such as structures 50 and 52 (e.g., structures such as structures 20, 12, 36, 38, 40, 26, and 24 of FIG. 2 or other structures to be joined by adhesive) may be assembled using adhesive 28. Adhesive 28 (e.g., pressure indicator adhesive tape) may be implemented using a one-part system (applied to one or both surfaces to be joined) or may be implemented using a two-part system (e.g., a system in which indicator material is applied to one of the surfaces to be joined and in which developer is applied to an opposing surface to be joined). Indicator can be implemented using a material that is detectable at infrared wavelengths, that is visible in the visible wavelength portion of the light spectrum, that fluoresces when exposed to ultraviolet light, that is magnetically detectable, that exhibits detectable qualities under ultrasonic imaging, or that is otherwise measurable by human visual inspection, camera 104 or a magnetic sensor, ultrasonic imaging sensor, or other sensors (e.g., sensor 104").

As part of the joining process of step 152, adhesive 28 is interposed between opposing structures to be joined such as structures 50 and 52 and is subjected to pressure. A press that is operated using computer-controlled positioners may apply pressure to structures 50 and 52 to compress adhesive 28 between opposing surface of structures 50 and 52 and thereby pressure activate the pressure sensitive adhesive material that is contained within adhesive 28. While applying pressure in this way, the indicator functions of adhesive 28 are activated.

The amount of activation of the pressure indicator in adhesive 28 and therefore the amount of indicator that becomes visible or otherwise exhibits a detectable indicator characteristic depends on the amount of pressure that is applied to each portion of adhesive 28. If, for example, a portion of the joint that is being formed is exposed to sufficient pressure to burst microspheres 58 in adhesive 28, those microspheres will release indicator and will exhibit a visible stain or other detectable activation characteristic. At the same time, if a portion of the joint that is being compressed between structures 50 and 52 is exposed to insufficient pressure to activate the pressure sensitive adhesive material and indicator material in adhesive 28, microspheres 58 will fail to burst and the expected visible stain or other detectable activation characteristic of the pressure indicator adhesive will not be present.

Camera 104 and other sensors 104" can monitor the activation of adhesive 28 during joint formation and/or the adhesive joint may be inspected following joint formation. Joints may be formed in production units and/or in test units. Test structures can be constructed using the same structures that are used in production structures or can be constructed using comparable structures that have been modified to facilitate inspection. As an example, if it is difficult to visually inspect a joint between display cover layer 20 and housing 12 under inactive area IA due to the presence of opaque masking layer 28 in production units, opaque masking layer 28 can be omitted in test units to provide equipment 92 with feedback on the adhesive joint formation process. Test units can also be disassembled to facilitate inspection (step 154). For example, test units can be disassembled by heating adhesive 28 sufficiently to allow the joint formed from adhesive 28 to be pulled apart and inspected.

When real-time inspection with equipment 92 reveals that the adhesive joint formed from adhesive 28 is not being formed perfectly, dynamic adjustments can be made to equipment 92. For example, if camera 104 detects that one side of a joint is being subjected to sufficient pressure but that another side of the joint is being subjected to insufficient pressure, control circuitry 94 can direct the computer controlled positioner 98 that is being used to form the low-pressure side of the joint to apply an increased amount of pressure. In this way, the joint formation process can be continuously monitored and controlled to ensure that satisfactory adhesive joints are formed.

The monitoring process of step 152 (and, if desired, the post-disassembly operations of step 154) may use infrared images taken through infrared ink or other infrared-transparent (but visibly opaque) masking layers such as layer 34 of FIG. 2, using visible light, using ultraviolet light, using microspheres 58 that contain dye or other indicator that is visible upon microsphere rupturing without using developer, using microspheres 58 that contain indicator that becomes visible when microspheres 58 burst to release the indicator and thereby cause the indicator to react with developer, using microspheres that have one type (e.g., a single color) of indicator, using microspheres that contain multiple colors of indicator that are released at different respective pressures and that can color-mix upon activation, using microspheres that contain multiple colors of indicator that are configured to activate at respective discrete ranges of activation pressures (e.g., mutually exclusive ranges of activation pressures), using magnetic indicator materials, or using other suitable pressure indicator arrangements.

At step 156, the results from the disassembly and inspection operations of step 154 may be used to calibrate equipment 92. For example, if inspection of a test unit reveals that insufficient pressure is being applied on one side of a joint, equipment 92 can be adjusted so that subsequent joints that are formed on production units will be properly formed using satisfactory pressure on that side of the joint. Equipment 92 may also be calibrated using information from camera 104 or other sensors (i.e., equipment 92 can adjust how much pressure is applied using positioners 98 to ensure even pressure application). In general, pressure application adjustments made by control circuitry 94 may be made during the process of acquiring data at step 152 with camera 104 (or other sensors) and while pressure is being applied to a given joint at step 152 or may be made following application of pressure to a joint, analysis of the joint that was formed, and subsequent calibrating adjustment of the pressure application process during step 156.

Production units formed during the operations of step 156 may exhibit uniform and satisfactory adhesive joint formation due to real time pressure application adjustments and/or calibration of fabrication equipment 92.

The foregoing is merely illustrative and various modifications can be made by those skilled in the art without departing from the scope and spirit of the described embodiments. The foregoing embodiments may be implemented individually or in any combination.

What is claimed is:

1. A method of forming adhesive joints, comprising:
   compressing a pressure indicator pressure sensitive adhesive between a first structure and a second structure, wherein compressing the pressure indicator pressure sensitive adhesive comprises controlling computer-controlled positioners;
   inspecting the pressure indicator pressure sensitive adhesive to evaluate an adhesive joint formed from the pressure indicator pressure sensitive adhesive between the first structure and the second structure, wherein inspecting the pressure indicator pressure sensitive adhesive comprises capturing images of the pressure indicator pressure sensitive adhesive with a camera; and
   analyzing information from the camera and making pressure application adjustments to the computer-controlled positioners to adjust formation of the adhesive joint based on the analyzed information.

2. The method defined in claim 1 wherein the first structure comprises glass, wherein the second structure comprises metal, and wherein compressing the pressure indicator pressure sensitive adhesive comprises compressing the pressure indicator pressure sensitive adhesive between the glass and the metal.

3. The method defined in claim 2 wherein the pressure indicator pressure sensitive adhesive includes indicator, wherein the method further comprises applying primer that contains developer to the metal, and wherein the developer interacts with the indicator during compression of the pressure indicator pressure sensitive adhesive.

4. The method defined in claim 1 further comprising providing the pressure indicator pressure sensitive adhesive between the first and second structures before compressing the pressure indicator pressure sensitive adhesive, wherein providing the pressure indicator pressure sensitive adhesive comprises applying pressure sensitive adhesive containing microspheres to the first structure and applying developer to the second structure.

5. The method defined in claim 1 further comprising providing the pressure indicator pressure sensitive adhesive between the first and second structures before compressing the pressure indicator pressure sensitive adhesive, wherein providing the pressure indicator pressure sensitive adhesive comprises applying pressure sensitive adhesive material that contains microspheres with indicator to at least the first structure.

6. The method defined in claim 1 further comprising providing the pressure indicator pressure sensitive adhesive between the first and second structures before compressing the pressure indicator pressure sensitive adhesive, wherein providing the pressure indicator pressure sensitive adhesive between the first and second structures comprises applying adhesive tape that contains developer, pressure sensitive adhesive material, and microspheres containing indicator that is configured to react with the developer.

7. The method defined in claim 1 wherein the pressure indicator pressure sensitive adhesive comprises first microspheres containing a first type of indicator and second microspheres containing a second type of indicator and wherein compressing the pressure indicator pressure sensitive adhesive comprises compressing the first type of microspheres and the second type of microspheres between the first structure and the second structure.

8. The method defined in claim 7 wherein inspecting the pressure indicator pressure sensitive adhesive comprises detecting a color formed by mixing the first type of indicator and the second type of indicator.

9. The method defined in claim 7 wherein inspecting the pressure indicator pressure sensitive adhesive comprises detecting a color associated with a selected one of first type of indicator and the second type of indicator.

10. The method defined in claim 1 wherein the first structure comprises a layer of glass coated with a layer of visibly opaque and infrared-light-transparent material and wherein inspecting the pressure indicator pressure sensitive adhesive comprises capturing infrared images of the pressure indicator pressure sensitive adhesive through the layer of visibly opaque and infrared-light-transparent material.

11. The method defined in claim 1 wherein the pressure indicator pressure sensitive adhesive comprises magnetic material and wherein inspecting the pressure indicator pressure sensitive adhesive comprises measuring the magnetic material with a magnetic sensor.

12. The method defined in claim 1 wherein inspecting the pressure indicator pressure sensitive adhesive comprises disassembling the first and second structures.

13. The method defined in claim 1 wherein the pressure indicator pressure sensitive adhesive comprises transparent pressure sensitive adhesive material with microspheres containing indicator and wherein inspecting the pressure indicator pressure sensitive adhesive comprises observing the microspheres through the transparent pressure sensitive adhesive material.

14. The method defined in claim 1 wherein the first structure comprises glass, wherein the second structure comprises metal, and wherein compressing the pressure indicator pressure sensitive adhesive comprises compressing the pressure indicator pressure sensitive adhesive between the glass and the metal.

15. The method defined in claim 1 further comprising providing the pressure indicator pressure sensitive adhesive between the first and second structures before compressing the pressure indicator pressure sensitive adhesive, wherein providing the pressure indicator pressure sensitive adhesive between the first and second structures comprises applying adhesive tape that contains developer, pressure sensitive adhesive material, and microspheres containing indicator that is configured to react with the developer, wherein the microspheres are configured to burst and release the indicator when the pressure indicator pressure sensitive adhesive is compressed between the first and second structures.

16. The method defined in claim 1 further comprising providing the pressure indicator pressure sensitive adhesive between the first and second structures before compressing the pressure indicator pressure sensitive adhesive, wherein providing the pressure indicator pressure sensitive adhesive comprises applying pressure sensitive adhesive containing microspheres to the first structure and applying developer to the second structure, and wherein compressing the pressure indicator pressure sensitive adhesive comprises bringing the pressure sensitive adhesive containing microspheres into direct contact with the developer.

17. A method of forming adhesive joints, comprising:
compressing a pressure indicator pressure sensitive adhesive between a first structure and a second structure; and
inspecting the pressure indicator pressure sensitive adhesive to evaluate an adhesive joint formed from the pressure indicator pressure sensitive adhesive between the first structure and the second structure, wherein inspecting the pressure indicator pressure sensitive adhesive comprises capturing infrared images with an infrared camera.

18. The method defined in claim 17, further comprising providing the pressure indicator pressure sensitive adhesive between the first and second structures before compressing the pressure indicator pressure sensitive adhesive, wherein providing the pressure indicator pressure sensitive adhesive between the first and second structures comprises applying adhesive tape that contains microspheres containing indicator that is detectable at infrared wavelengths.

19. A method of forming adhesive joints, comprising:
compressing a pressure indicator pressure sensitive adhesive between a first structure and a second structure; and
inspecting the pressure indicator pressure sensitive adhesive to evaluate an adhesive joint formed from the pressure indicator pressure sensitive adhesive between the first structure and the second structure, wherein inspecting the pressure indicator pressure sensitive adhesive comprises capturing ultrasonic images with an ultrasonic imaging sensor.

* * * * *